Patented Aug. 31, 1954

2,688,002

UNITED STATES PATENT OFFICE 2,688,002

METHOD OF PREPARING A SILICA-MAGNESIA-ALUMINA GEL CATALYST

Thomas H. Milliken, Jr., Chester, Pa., assignor to Houdry Process Corporation, Wilmington, Del., a corporation of Delaware No Drawing. Application March 11, 1950,
Serial No. 149,215

11 Claims. (Cl. 252—448)

The present invention relates to improved siliceous contact masses and their preparation and is particularly concerned with catalysts for use in catalytic conversion of hydrocarbons. The improved catalysts of the invention comprise particularly silica, magnesia, and alumina, prepared and treated as hereinafter described.

In catalytic cracking and similar processes for the conversion of hydrocarbons, there are presently in extensive commercial use several types of catalysts, particularly synthetic silica-alumina dried gel, and acid-activated subbentonite clay. Other catalysts have been proposed, in which small amounts of additional metal oxides or other components are incorporated with the silica-alumina as promoters, or for otherwise modifying the properties of the catalysts; and it has also been proposed to substitute all or part of the alumina in silica-alumina catalysts by certain metal oxides. Among such catalysts that have been suggested as showing particular promise are those composed of silica and magnesia or silica, alumina, and magnesia.

In my copending application, Serial No. 67,987, filed December 29, 1948 (issued as U. S. Patent No. 2,631,983 of March 17, 1953), of which this application is a continuation-in-part, certain novel methods are disclosed for the preparation of siliceous gel catalysts comprising magnesia, wherein the magnesia is incorporated as fine particles in a siliceous hydrosol which is then set to hydrogel. By the described methods of the earlier application magnesia-containing catalysts, and particularly spheroidal bead catalysts, of improved porosity are obtained.

In accordance with the present invention, silica-magnesia-alumina catalysts of desired high activity and demonstrating good product distribution characteristics, are obtained by a highly economic method utilizing in part abundant and cheap natural raw materials. The obtained catalysts, moreover, have desirable physical properties, particularly from the standpoint of excellent hardness, and improved porosity over known catalysts of essentially the same chemical composition but prepared in other ways. The superior catalysts of the invention are prepared, in general, by thoroughly admixing kaolin clay in finely divided form with principally silica gel and magnesium hydroxide, and treating the obtained product with a solution of a water soluble magnesium salt, such as magnesium sulfate. Catalysts possessing the desired properties may be prepared from these materials, pursuant to the invention, as substantially homogeneous structures having relatively continuous surfaces, such as beads; or aggregates or agglomerates of discrete smaller particles formed by extruding or casting a mixed slurry of the named materials having suitable consistency. The pellets, beads or granules thus obtained are finished by the usual steps including washing, drying, and calcination if desired. Physically strong and highly active catalysts are thus obtained. The activity and other properties of the catalyst, in accordance with one aspect of the invention, may be further enhanced by subjecting the formed catalyst pieces to subsequent treatment with mineral acid.

For the preparation of beads or similar homogeneous structures, which constitutes the preferred embodiment of the invention, the kaolin is suspended in the hydrosol or in one of the solutions used to prepare the silica-magnesia hydrosol, and the hydrosol is set to hydrogel beads in an immiscible fluid such as an oil in known manner; the beads thus formed containing the incorporated kaolin, after being washed free of soluble contaminants, are treated with an aqueous solution of the soluble magnesium salt.

In an alternative method which is particularly adapted for the preparation of contact masses of comparatively higher kaolin content, the kaolin is admixed in a slurry with freshly prepared wet silica hydrogel and magnesium hydroxide, to which slurry the soluble magnesium salt may be added, unless the pH of the slurry is such as to cause substantially complete precipitation of the soluble magnesium salt. The mixed slurry is aged, in the presence of magnesium sulfate, then filtered, and the filter cake made into pieces of desired size and shape by casting or extruding, or by simply granulating the same.

The kaolin should be employed in an amount to constitute upwards of 20% and up to about 80% of the finished catalyst, and preferably in an amount to provide about 25–50% by weight thereof. Compositions containing over 50% kaolin present difficulties in pumping and metering of such thick solutions, so that as a practicable matter these cannot be readily sprayed as liquid hydrosols to form beads, and must therefore be formed into granules or pellets by some other method, such as by one of the alternative methods employing a slurry above referred to.

Silica magnesia hydrosols useful in accordance with the invention for the preparation of active contact masses, may be prepared in a manner heretofore generally described in my copending application above referred to. Thus, magnesium hydroxide or a hydratable oxide of magnesia may be suspended in an aqueous solution of an alkali metal silicate under suitable pH conditions causing formation of a siliceous sol. The particles of magnesia or magnesium hydroxide are not retained in particulate form but at least in part enter into a complex chemical combination with components of the sol or the ultimate hydrogel under the conditions of the process. The kaolin may be initially suspended in the silicate solution or in the solution of the other reactant or reactants employed in forming the hydrosol. It is advantageous to employ the sol-forming reactants in proportions and amounts obtaining comparatively fast setting sols, such as those setting in 5 seconds or less, so that the kaolin has little opportunity to settle out in the hydrosol and become localized in the gel during setting thereof. Increase of product concentration and suitable choice of pH favor the formation of fast setting hydrosols.

The following examples illustrate the production of catalysts in accordance with the invention and are not to be construed as limitations on the scope thereof.

EXAMPLE I

The following aqueous solutions or suspensions were thoroughly admixed together in equal volumetric quantities at 20° C. to form the hydrosol:

"Solution" #1 was composed of 36.5 parts by weight of "N" Brand sodium silicate (a commercial water glass solution comprising approximately 28.7% $SiO_2$, 9.0% $Na_2O$) in water, and had a specific gravity of 1.207.

"Solution" #2 was composed of 36.5 parts by weight of "N" Brand silicate and 4.74 parts by weight of heavy magnesia powder in prehydrated form, and had a specific gravity of 1.232. The heavy magnesia powder, prior to admixture with the silicate, was thoroughly hydrated by soaking in water for twelve hours. The silicate-magnesia mixture was aged by standing at room temperature for an additionol four hours prior to the admixing with solutions #1 and #2.

"Solution" #3 was composed of 3.12 parts by weight of CP sulfuric acid and 4.44 parts by weight of ground kaolin clay in water, the mixture having a specific gravity of 1.088.

The hydrosol formed from the mixed "solutions" was sprayed through a 5 mm. diameter nozzle into an oil layer of about 1½ feet in depth, wherein the hydrosol assumed the form of individual globules, which set in about 2 seconds to spheroidal hydrogel beads having a pH of 10.2. The oil employed was a medium lubricating oil admixed with perchlorethylene, the mixture having a specific gravity of 1.065 at 27° C.

(a) The gel thus formed had a product concentration of 150 grams per liter on the basis of $SiO_2+MgO$ and contained an additional 25 grams per liter of kaolin, giving approximately the proportions by weight of 56% silica, 24% magnesia and 20% kaolin.

(b) One portion of the wet hydrogel beads thus prepared was aged for a period of 25 minutes at 26° C. in a sodium sulfate solution having a specific gravity of 1.121 and a pH of 9.4. The aged beads were then washed in water (4 washes) and then immersed in 5% magnesium sulfate solution (specific gravity 1.05) for a period of 2 hours, followed by additional treatment in fresh magnesium sulfate solution of like concentration successively for 2 hours, overnight, and for 2 hours again, respectively. The magnesium sulfate treated beads were thereafter washed with water until free of sulfate ion and dried in an oven in 100% steam atmosphere for 5–6 hours at 250° F.

(c) A portion of the spheres from (b) above was subjected to heat treatment for 5 hours at 1350° F. in a flowing atmosphere composed of 10% steam and 90% air. The heat treated material thus obtained had a bulk density of about 0.89 kilogram per liter, and was found to have a porosity of 48.0 volume percent as measured by water adsorption. The heat treated catalyst was then subjected to activity tests by the several methods hereinafter described.

(d) In one of these tests the activity of the catalyst was determined by the acidity of the catalyst as measured by its chemisorption capacity for quinoline, expressed in milliequivalents quinoline chemisorbed per gram of catalyst, which values, it has been found, bear a definite correlated relation to cracking activity. The method of determining the quinoline number of the catalyst is as follows:

The catalyst is suspended in a perforated glass basket by a glass wire attached to one end of the beam of an analytical balance. Nitrogen at a constant pressure is then passed through a series of saturators containing liquid quinoline maintained at a constant temperature by a jacket containing boiling liquid. The nitrogen gas saturated with quinoline is passed through preheated vapor transfer lines into contact with the catalyst sample. Flow is continued until a relatively constant weight is observed, and a stream of preheated nitrogen gas is then passed over the catalyst to remove physically held quinoline until a substantially constant weight is observed. The difference in weight before contact with quinoline and after the nitrogen purge is taken as the amount of quinoline chemisorbed. Details of this test are described by G. A. Mills, E. R. Boedeker, and A. G. Oblad in "Chemical Characteristics of Cracking Catalysts," Journal of the American Chemical Society (1950), volume 72, page 1554.

The quinoline number of the catalyst described under (c) above was found to be 0.052 milliequivalent per gram, which corresponds approximately to a cracking activity approaching 50 volume percent gasoline as measured by the well known CAT-A method described in "Laboratory Method for Determining the Activity of Cracking Catalysts" by J. Alexander and H. G. Shimp, page R–537, National Petroleum News, August 2, 1944.

(e) The same catalyst was subjected to actual test in the cracking of a light East Texas gas oil by the CAT-A method and showed an average production of 48.4 gasoline by volume of charge, 4.8% by weight coke and 6.5% by weight dry gas of 1.24 gas gravity. These values indicate that the activity of the described catalyst is higher than typical or commercial silica-alumina cracking catalyst, while less gas is produced by this type of catalyst even at the high conversion level.

EXAMPLE II (a) A portion of the wet hydrogel beads described in Example Ia above was aged for ½ hour at room temperature in sodium sulfate solution of 1.121 specific gravity and having a pH of 9.4. The wet beads were then separated from the solution and immersed in 5% magnesium sulfate solution for 6 hours at 54° C., a part of the beads thereafter removed and the remainder permitted to remain in the solution overnight (approximately 12 hours). The part of the beads so remaining were then removed from the solution and aged in 5% fresh hot magnesium sulfate solution for 4 hours at 75° C., then washed in 5 changes of fresh water, and thereafter given 4 separate treatments of 2 hours each in 5% magnesium sulfate solution for the purpose of removing the alkali metal therefrom by base exchange with magnesium. The base exchanged material was washed in water until free from sulfate, dried in the same manner as described in Example Ib above, and then heat treated in the manner described in Example Ic above. The heat treated catalyst had a bulk density of approximately 1.09. Tested for activity by the quinoline chemisorption method described, this catalyst showed an activity corresponding to a quinoline number of 0.0541 milliequivalents per gram.

EXAMPLE III

Samples of the heat treated material of Example II above were subjected to acid treatment respectively, following the procedure hereinafter described:

(a) Sample number 1 was treated at room temperature with acid solutions containing 5% $H_2SO_4$ by weight in a series of separate treats with fresh acid, each in amounts equal to the weight of the catalyst treated; the first treatment being of 10 minutes duration and 4 additional treatments of 2 hours duration each.

(b) Sample number 2 was treated at room temperature with an acid solution containing 10% by weight $H_2SO_4$ for the same number of treatments and like duration as sample 1 above.

(c) Sample number 3 was treated in boiling 5% sulfuric acid solution for the same number of treatments and like duration as sample 1 above.

(d) Each of the foregoing acid treated samples were then water washed until sulfate free, and dried at 240° F. for 2 hours in flowing air. The dried samples were then heat treated at 1250° F. for 5 hours in "bone dry" air (less than 0.1% $H_2O$ by weight).

The activity of the several samples after acid treatment is shown in the following table:

*Table*

| Catalyst | Quinoline No. Prior to acid treatment | Quinoline No. after acid treatment | Approximate CAT-A activity (est.) |
|---|---|---|---|
| Sample 1 | 0.054 | 0.070 | 55–56 |
| Sample 2 | 0.054 | 0.073 | 56–57 |
| Sample 3 | 0.054 | 0.083 | 60–62 |

These activities are at least comparable with or surpass the upper limits of known silica-magnesia and silica-alumina-magnesia catalyst tested by the same method. The estimated CAT-A activity given in the table as determined from the quinoline number is based on a sufficiently large number of tests establishing the correlation.

The overall results obtained with catalysts of the invention indicate that these are typically more active than those prepared from kaolin alone or from silica-magnesia alone, and that these catalysts characteristically show an improved selectivity in cracking of hydrocarbon oils, producing higher yields of desired liquid products, particularly in the gasoline boiling range, and considerably less fixed gas. The shaped catalytic masses whether formed as agglomerated pellets or beads, are quite dense and extremely hard. The crystalline structure of the catalyst largely resembles that of laminate-type silica-alumina-magnesia minerals.

Instead of treating the hydrogel with magnesium sulfate as described in the foregoing examples other soluble magnesium salts may be employed, for instance the nitrates or acetates.

By the incorporation of kaolin in sufficient quantity, as in an amount of not less than 20% of the catalyst, significant improvement in porosity is evidenced. It appears from X-ray examination that a portion of the incorporated kaolin, seemingly as a result of physical or chemical change, completely loses its characteristic kaolin structure or becomes minimized and obscured by the laminate structure of the catalyst. By the incorporation of a sufficient amount of kaolin, as hereinbefore indicated, an excess is provided over that found necessary to obtain the characteristic laminate structure displayed by the catalyst.

Most rapidly setting silica-magnesia hydrosols are obtained at a pH of about 5 to 10. Within this pH range gels including the stated quantities of kaolin and setting in less than 5 seconds are obtained at a product concentration of $SiO_2$ and MgO of about 80 grams/liter; at higher product concentration going up to about 125 grams per liter the setting time is further reduced, as down to a fraction of a second.

Active catalysts of the character described are obtained from hydrosols containing 85 to 25 parts by weight $SiO_2$ to 15 to 75 parts MgO; catalysts of higher activity are generally obtained with the magnesia being present in an amount of approximately ⅓ to equal or slightly above that of the $SiO_2$, with the optimum lying in the approximate ratio of 60 to 65 parts $SiO_2$ and 40 to 35 MgO.

In the use of the catalysts prepared in accordance with the present invention, the usual conditions of cracking can be availed of without modification, the catalyst being in the form of fine particles, granules, beads, pellets or the like. The described catalyst can be employed in fixed bed processes for cracking of petroleum fractions as well as in processes in which the catalyst moves or is moved through the reaction zone. As an example of a fixed bed operation, cracking may be carried out at a temperature of 800–900° F., employing a space rate (volume of charge liquid basis per volume of catalyst per hour) of about 1.5 and a pressure of about 15 pounds per square inch gauge. The temperature, of course, may be varied within the range of from about 700 up to about 1100° F., the space rate within the range of about 0.5 to 8 and pressures may be employed from about atmospheric or slightly lower up to about 100 pounds per square inch or higher. Under these conditions the operating period "on stream" may range from five to sixty minutes, for example 10 to 30 minutes alternating with regeneration periods. In commercial operation temperatures above 750° F. are preferred. Steam may be added to the charge stock and is particularly advantageous in assisting the vaporization of heavier stocks.

In processes other than the fixed bed, such as where the catalyst moves through the reaction zone, the conditions employed may be such as to subject the oil to substantially equivalent conditions including contact time and ratios of oil to catalyst as those set out above in connection with the fixed bed process.

Reforming may be carried out with catalyst of the invention by charging a virgin or cracked gasoline or naphtha fraction under conditions similar to those employed in cracking.

Whereas in the fixed bed operation the catalyst is alternately subjected to regeneration, in the other processes the catalyst is passed during its cycle through a separate regeneration zone. In all of these processes regeneration is effected by contacting the catalyst after use, with air or other oxygen-containing gas to burn off carbonaceous deposit.

Obviously many modifications and variations of the invention as hereinbefore set forth may be made without departing from the spirit and scope thereof and therefore only such limitations should be imposed as are indicated in the appended claims.

I claim as my invention:

1. The method of catalyst preparation which comprises preparing an admixture of finely divided kaolin clay with silica sol and magnesium hydroxide, setting the sol to hydrogel, aging said hydrogel in wet state and thereafter drying the same, at least part of said aging being effected by treating the hydrogel with an aqueous solution of a magnesium salt.

2. The method in accordance with claim 1 wherein said kaolin is incorporated in an amount to constitute about 20–80% by weight of the finished catalyst.

3. The method of preparing magnesia-containing siliceous bead catalysts of improved physical properties, which comprises suspending finely divided kaolin in a siliceous hydrosol together with thoroughly hydrated magnesium oxide, setting globules of the hydrosol to hydrogel in a water immiscible liquid medium, purifying the obtained globules of water soluble contaminants, treating the purified globules for at least several hours with an aqueous solution of a magnesium salt, and drying the globules.

4. The method in accordance with claim 3 wherein said kaolin is incorporated in an amount providing about 20–50% by weight of the finished catalyst.

5. The method of preparing silica-magnesia-alumina bead catalyst, which comprises suspending thoroughly hydrated magnesia in a solution of an alkali metal silicate and admixing the obtained suspension with finely divided kaolin and an acid to form a siliceous hydrosol containing the kaolin, the $SiO_2$ and $MgO$ content of said suspension and the quantity of acid being selected to provide a fast-setting hydrosol, discharging the obtained hydrosol into a water-immiscible fluid medium to form globules thereof, setting globules of the hydrosol to hydrogel beads while in said medium, treating the beads for at least several hours in an aqueous solution of magnesium salt, drying the thus treated beads, and calcining the dried beads.

6. The method in accordance with claim 5 including the step of aging the hydrogel beads in aqueous media in addition to the treatment with magnesium sulfate.

7. The method of preparing silica-magnesia-alumina catalyst of high activity and improved physical properties, which comprises forming a silica-magnesia hydrogel containing finely divided kaolin, aging the hydrogel in a soluble magnesium salt solution, drying the hydrogel, and treating the dried gel with mineral acid solution.

8. The method in accordance with claim 7 wherein said hydrogel is calcined prior to said treatment with mineral acid solution.

9. The method in accordance with claim 7 wherein said treatment with mineral acid involves successive treatments with fresh dilute sulfuric acid.

10. The method in accordance with claim 7 wherein said treatment with mineral acid is carried out at the boiling temperature of the acid solution.

11. The method of preparing silica-magnesia-alumina catalyst of high activity and improved porosity, which comprises forming a silica-magnesia hydrosol containing 25–50% kaolin suspended therein, setting the hydrosol to hydrogel, at a product concentration of at least 80 grams per liter $SiO_2$ and $MgO$ and at a pH of 5 to 10, aging the wet hydrogel in magnesium salt solution, washing the hydrogel, treating the washed hydrogel with magnesium sulfate solution, washing the hydrogel free of sulfate ions, drying the hydrogel in a steam atmosphere, and thereafter heat treating the obtained dried gel.

References Cited in the file of this patent

UNITED STATES PATENTS

| Number | Name | Date |
|---|---|---|
| 1,900,859 | Connolly et al. | Mar. 7, 1933 |
| 2,241,791 | Rembert | May 13, 1941 |
| 2,285,314 | Thomas et al. | June 2, 1942 |
| 2,363,832 | Connolly | Nov. 28, 1944 |
| 2,432,634 | Thomas | Dec. 16, 1947 |
| 2,442,884 | Webb et al. | June 8, 1948 |
| 2,454,942 | Pierce et al. | Nov. 30, 1948 |
| 2,470,410 | Nelson | May 17, 1949 |
| 2,487,065 | Milliken | Nov. 8, 1949 |
| 2,507,625 | Ehrhardt | May 16, 1950 |
| 2,507,864 | Moore et al. | May 16, 1950 |

FOREIGN PATENTS

| Number | Country | Date |
|---|---|---|
| 590,252 | Great Britain | June 11, 1947 |